P. H. HAMILTON.
HOLDER FOR OIL BURNERS.
APPLICATION FILED DEC. 14, 1918.
1,324,816.
Patented Dec. 16, 1919.
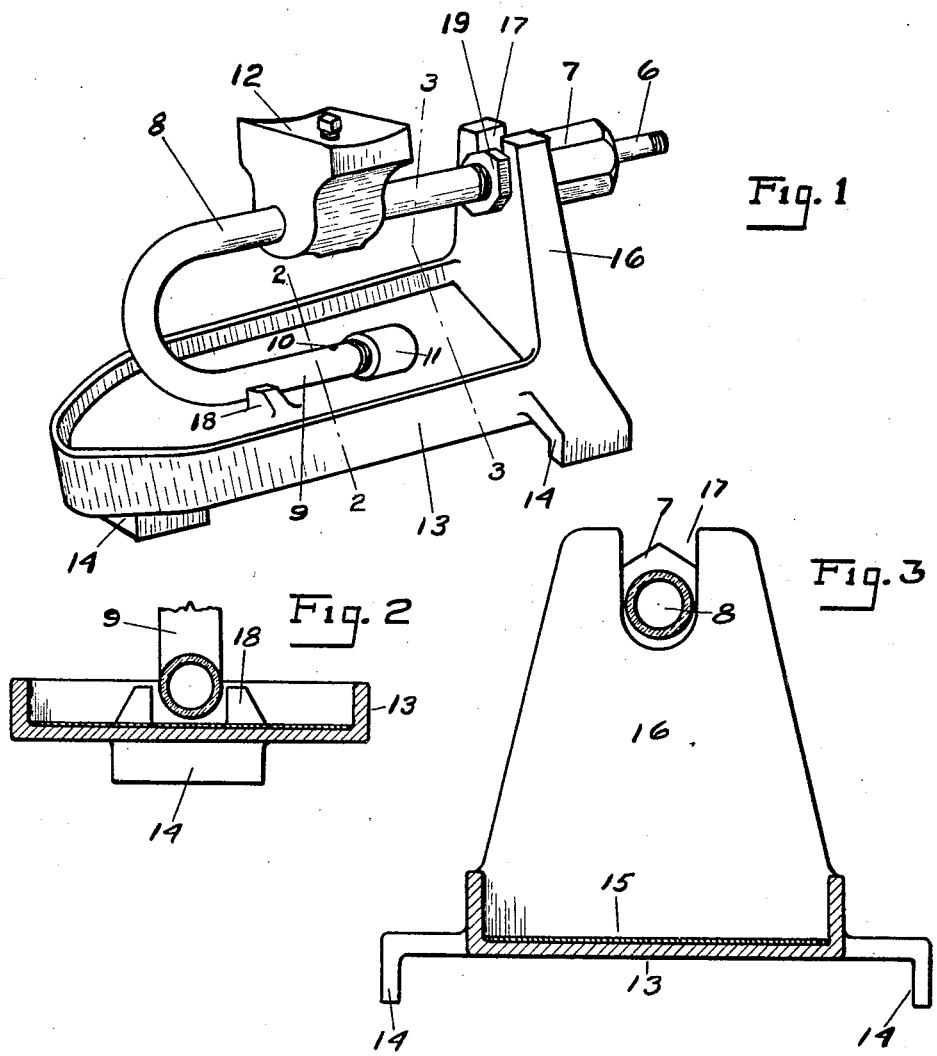
Inventor
Paul H. Hamilton
By John A. Bommhardt
Attorney

UNITED STATES PATENT OFFICE.

PAUL H. HAMILTON, OF CLEVELAND, OHIO, ASSIGNOR TO THE AUGMORE MANUFACTURING CO., OF CLEVELAND, OHIO, A CORPORATION OF OHIO.

HOLDER FOR OIL-BURNERS.

1,324,816.  Specification of Letters Patent.  Patented Dec. 16, 1919.

Application filed December 14, 1918. Serial No. 266,807.

*To all whom it may concern:*

Be it known that I, PAUL H. HAMILTON, a citizen of the United States, residing at Cleveland, in the county of Cuyahoga and State of Ohio, have invented certain new and useful Improvements in Holders for Oil-Burners, of which the following is a specification.

This invention relates to oil burners of the type known as overlying retort, in which the oil is conducted through a pipe located above the jet opening so that the flame heats the oil in the pipe and generates gas which is burned at the opening.

The object of the present invention is to provide an improved holder or casing for supporting such a device in position for use, the holder comprising a casting which can be cheaply made in one piece and which eliminates a number of pipe joints or unions heretofore used in devices of this kind. The holder may be located in a stove or any other place where the burner is to be used.

The invention is illustrated in the accompanying drawings, in which—

Figure 1 is a perspective view of the device. Fig. 2 is a section on the line 2—2 of Fig. 1. Fig. 3 is a section on the line 3—3 of Fig. 1.

Referring specifically to the drawings, 6 indicates the oil supply pipe which is coupled by union 7 to the retort pipe 8 which is curved to U-shape to form a lower branch 9 provided with a jet opening 10 and closed at the end by a cap 11. A heating block 12 is mounted on the retort tube above the jet, to receive the heat and conduct it to the tube.

The holder or support comprises a base 13 in the form of a pan standing on legs 14 and this pan may have a piece of absorbent material 15 in the bottom thereof, such as asbestos or the like. One end of the pan has a standard or upright part 16 with a notch 17 at the top and the bottom of the pan is provided with two lugs 18 projecting upwardly therefrom.

In assembling the parts, the upper branch of the tube 8 is set in the notch 17 where it is clamped by the coupling 7 and a nut 19 on the tube, the nut being tightened against the upright 16 adjacent the notch. The lower arm of the tube fits between the lugs 18. When the parts are thus assembled, the burner tube will be securely held in position in the holder. The pan 13 is used for starting purposes by allowing some of the oil to flow out of the hole 10 into the pan and lighting the same to start the generation of gas in the usual manner.

The simplicity and cheapness of the device are obvious and it can be very quickly assembled for the intended purposes.

I claim:

The combination with the U-shaped tube of a burner of the overlying retort type, of a holder comprising a pan into which the lower arm of the tube extends and an upright at one end of the pan having a notch receiving the upper arm of the tube, clamping means on the tube and engaging opposite sides of said upright, and lugs in the bottom of the pan, between which the lower arm of the tube fits.

In testimony whereof, I do affix my signature in presence of two witnesses.

PAUL H. HAMILTON.

Witnesses:
JOHN A. BOMMHARDT,
ROBERTSON BOWIE.